(12) United States Patent
Shoji et al.

(10) Patent No.: US 7,280,824 B2
(45) Date of Patent: Oct. 9, 2007

(54) WIRELESS COMMUNICATION SYSTEM (75) Inventors: Yozo Shoji, Tokyo (JP); Hiroyo Ogawa, Tokyo (JP)

(73) Assignee: National Institute of Information and Communications Technology (JP)

( * ) Notice: Subject to any disclaimer, the term of this patent is extended or adjusted under 35 U.S.C. 154(b) by 105 days.

(21) Appl. No.: 10/545,297

(22) PCT Filed: Feb. 28, 2003

(86) PCT No.: PCT/JP03/02328

§ 371 (c)(1),
(2), (4) Date: Aug. 11, 2005

(87) PCT Pub. No.: WO2004/077697

PCT Pub. Date: Sep. 10, 2004

(65) Prior Publication Data

US 2006/0253872 A1 Nov. 9, 2006

(51) Int. Cl.
*H04M 3/00* (2006.01)

(52) U.S. Cl. ............... 455/418; 455/419; 455/420; 455/83; 455/88; 370/338; 370/445; 370/469; 370/462; 370/322; 370/346

(58) Field of Classification Search ............. 455/83, 455/88, 414.1, 418, 419; 370/338, 445, 469, 370/462, 322, 346, 347, 461; 340/3.51, 531, 340/506, 522, 539.1, 507, 508, 505
See application file for complete search history.

(56) References Cited

U.S. PATENT DOCUMENTS 6,112,069 A * 8/2000 Na .................. 455/296
6,335,814 B1 * 1/2002 Fuse et al. .............. 398/201
6,738,641 B1 * 5/2004 Elsasser ................. 455/523
2002/0147978 A1 * 10/2002 Dolgonos et al. ........... 725/62
2003/0206532 A1 * 11/2003 Shpak ................... 370/322

FOREIGN PATENT DOCUMENTS

JP  2001-053640  * 2/2001

* cited by examiner

*Primary Examiner*—Nay Maung
*Assistant Examiner*—Dominic E. Rego
(74) *Attorney, Agent, or Firm*—Bacon & Thomas, PLLC

(57) ABSTRACT

A wireless communication system according to the invention is to perform communication with a terminal station at a radio frequency higher than a millimeter wave band. The wireless communication system includes, as transmission devices to the terminal station, a center station device which forms a baseband signal to the terminal station and a plurality of access point devices which receive delivered signals from the center station device and emit radio waves to the terminal station. Cover areas of the access point devices partially overlap to constitute a service area to the terminal station by all the cover areas.

In this manner, a frequency higher than a millimeter wave band is applied to wireless communication to the terminal station to make it possible to widen the service area.

When each of the access point devices has a configuration which simultaneously sends a transmission signal main body and a local oscillation signal of a radio frequency and the terminal station has a configuration which perform a square-law detection to a synthesized signal of the received transmission signal main body and the local oscillation signal, the terminal station can obtain a demodulated signal which is free from a frequency offset and a phase fluctuation of the local oscillation signal and which is reduced in doppler frequency.

4 Claims, 5 Drawing Sheets

WIRELESS COMMUNICATION SYSTEM

CROSS-REFERENCE TO RELATED APPLICATIONS

This application is a National Phase Application (35 USC 371) of PCT/JP2003/002328 filed Feb. 28, 2003.

TECHNICAL FIELD

The present invention relates to a wireless communication system which can be applied to a high-speed wireless communication system using a millimeter wave band of, e.g., 60-GHz band.

BACKGROUND ART

In accordance with the recent development of wireless communication demand for computer communication or the like, a technique which transmits a digital signal or an analog signal in a wide band with high quality is demanded. Due to the width of an occupied band and the shortage of frequencies in the current micromillimeter wave band, various wireless communication systems (for example, video multiplexing transmission system, a wireless LAN, a wireless home link, and the like) using high-frequency bands consisting of an SHF band or higher, i.e., 60-GHz to 70-GHz band, in other words, millimeter waves are researched and developed.

Document 1: Hamaguchi, et al, "Development of Millimeter-Wave Video Transmission System II", TSMMW '01, P-17, March 2001

Document 2: Hamaguchi et al., "Millimeter-Wave Ad Hoc Wireless Access System", TSMMW '02, P-1, March 2002

According to Document 1 or Document 2, a "millimeter wave self-heterodyne transmission scheme" which realizes stable communication at low cost in a millimeter wave band is proposed. The effectiveness of the system is principally proved by an application targeted to immobile communication or nomadic communication.

However, the mobile communication system in a millimeter wave band includes problems to be further studied.

For example, one base station can cover only a small area (few-millimeter order) to use a millimeter wave band in mobile communication, so that an arrangement of a base station in relation to mobile stations must be considered as a problem.

Furthermore, since a millimeter wave band has considerably high frequencies, a millimeter-wave-band oscillator having a stable oscillation frequency is still expensive. When a low cost and compact millimeter-wave-band oscillator is applied to a frequency converter or the like, a frequency offset or phase noise occurs as a problem.

In addition, since a millimeter wave band has short wavelengths, communication is easily affected by Doppler shift caused by movement of a mobile station. A method of excluding the influence of the Doppler shift is a problem to be solved.

It is an object of the present invention to provide a wireless communication system which realizes a network configuration and an access point configuration which can appropriately transmit a transmission signal to a receiving station.

It is another object of the present invention to provide a wireless communication system in which a mobile station can stably receive a transmission signal regardless of the accuracy of a local oscillator or Doppler shift.

DISCLOSURE OF THE INVENTION

A wireless communication system according to the present invention includes: a terminal station; a center station device which forms a baseband signal for the terminal station; and a plurality of access point devices which receive delivered signals from the center station device through a cable network, have cover areas partially overlapping to constitute a service area by all the cover areas, and emit radio waves having frequencies not lower than a millimeter wave band to the terminal station.

Since the service area is constituted by the plurality of access point devices, the service area can be widened even though a frequency not lower than the millimeter wave band is applied in wireless communication.

It is assumed that each of the access point devices is designed to simultaneously transmit a transmission signal main body in a radio frequency band and a local oscillation signal of a radio frequency on the basis of a delivery signal given to the access point device and that the terminal station has square-law means which performs a square-law detection of a synthesized signal of the received transmission signal main body and the local oscillation signal. In this case, the terminal station can obtain a demodulated signal free from a frequency offset or phase fluctuation of the local oscillation signal. Even though Doppler shift is caused by relative movement of the access point device and the terminal station, Doppler shift in a demodulated signal can be reduced.

When radio frequencies relating to the plurality of access point devices having cover areas overlapping at a boundary thereof are made different from each other, even though the terminal station is located at the boundary, preferable receiving accuracy can be achieved.

BEST MODE FOR CARRYING OUT THE INVENTION

First Embodiment

A first embodiment of a wireless communication system according to the present invention will be described below with reference to the accompanying drawings.

Figure 1:
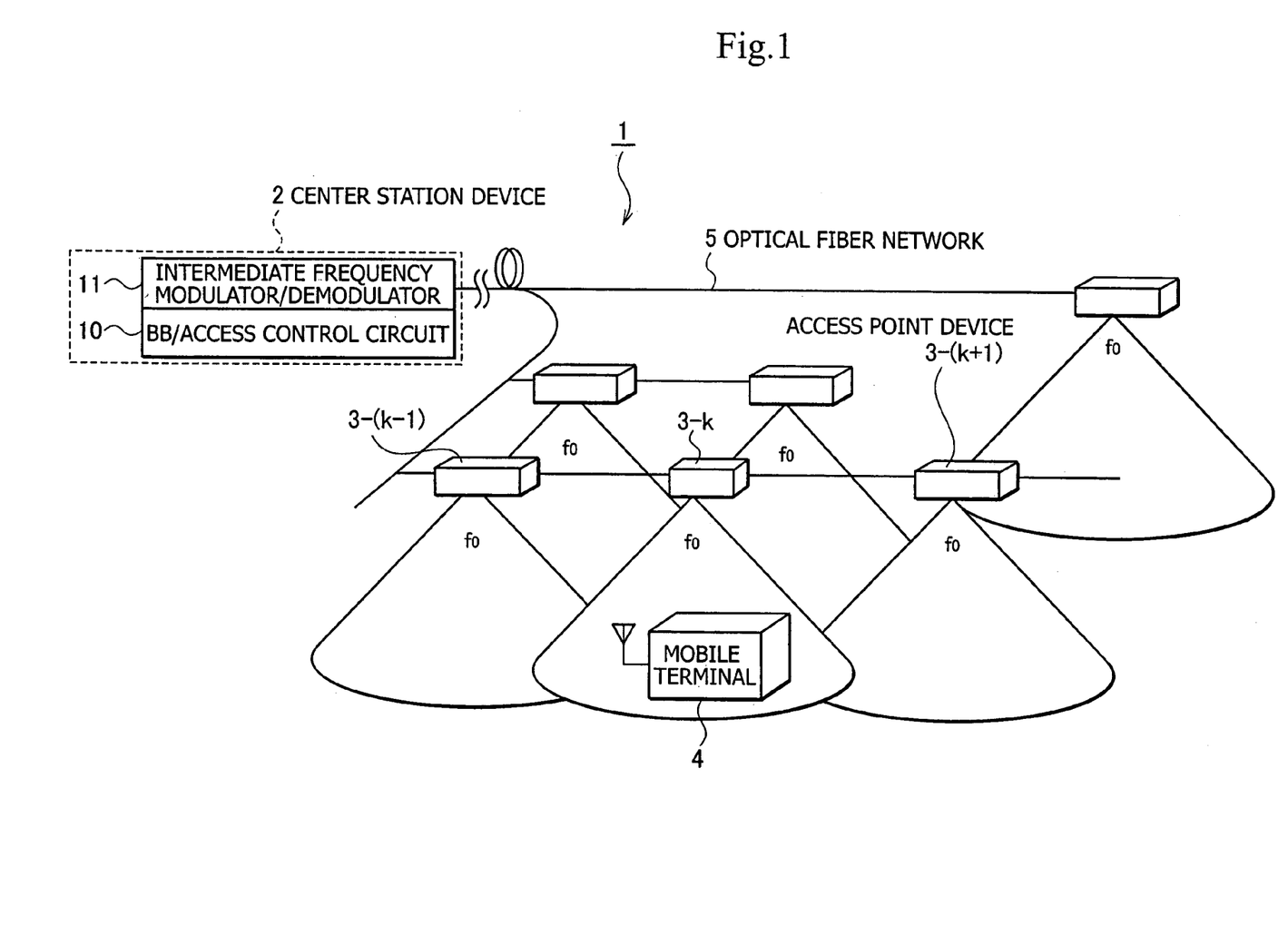
FIG. 1 is a block diagram showing an entire configuration of a wireless communication system according to a first embodiment.

FIG. 1 is a block diagram showing an entire configuration of a wireless communication system 1 according to the first embodiment.

In FIG. 1, the wireless communication system 1 according to the first embodiment has a center station device 2, a plurality of access point devices 3-(k−1), 3-k, 3-(k+1), ... and one mobile terminal 4 or a plurality of mobile terminals 4 (only one mobile terminal 4 is shown in FIG. 1).

The center station device 2 is connected to the plurality of access point devices 3-(k−1), 3-k, 3-(k+1), ... by an optical fiber network 5. Although not shown in FIG. 5, photo couplers are arranged at branch points of the optical fiber network 5.

The plurality of access point devices 3-(k−1), 3-k, 3-(k+1), ... are planarly developed to have cover areas (cells) partially overlapping and appropriately arranged. In order to suppress the number of branch points of the optical fiber 5, a plurality of access point devices may be appropriately cascade-connected to one optical fiber portion extending from a certain branch point downward (in a direction away from the center station device 2).

The same transmission signal is delivered from the center station device 2 to all the access point devices 3-(k−1), 3-k, 3-(k+1), ... connected to one optical fiber network 5. As a result, the mobile terminals 4 recognize all the plurality of cover areas as one service area.

More specifically, a combination of the center station device 2, the plurality of access point devices 3-(k−1), 3-k, 3-(k+1), ..., and the optical fiber network 5 corresponds to one base station in a mobile telephone system or the like.

The center station device 2 includes a BB (BaseBand process)/access control circuit 10 and an intermediate frequency modulator/demodulator 11.

The BB/access control circuit 10 is to perform a transmitting process and a receiving process for a baseband signal of an information channel or a signal channel and an access control process to the mobile terminals 4. The BB/access control circuit 10 gives a baseband signal to an intermediate frequency modulator/demodulator 11 in transmission, and receives the baseband signal from the intermediate frequency modulator/demodulator 11 in reception.

The intermediate frequency modulator/demodulator 11 is to modulate the baseband signal into an intermediate frequency signal in transmission and demodulates the intermediate frequency signal into the baseband signal in reception. In this case, a modulation/demodulation scheme to be applied is arbitrarily selected. For example, an 8-phase PSK modulation scheme can be applied.

The intermediate frequency modulator/demodulator 11 includes an electric/optical converter which electric/optical-converts the modulated intermediate frequency signal (transmission signal) to send the converted signal to the optical fiber 5 and an optical/electric converter which optical/electric-converts the intermediate frequency signal sent from the optical fiber 5 and consisting of an optical signal.

A communication circuit device which uses a high frequency in a millimeter wave band is still expensive. For this reason, a signal exchange between the center station device 2 and the plurality of access point devices 3-(k−1), 3-k, 3-(k+1), ... is performed at an intermediate frequency (IF). In this case, for example, as the intermediate frequency, 400 MHz is used. The signal exchange between the center station device 2 and the plurality of access point devices 3-(k−1), 3-k, 3-(k+1), ... by the radio frequency (RF) is included in a modification of the first embodiment.

The signal exchange between the center station device 2 and the plurality of access point devices 3-(k−1), 3-k, 3-(k+1), ... is performed through the optical fiber network 5. In place of the optical fiber network 5, an electric cable network may be used.

Figure 2:
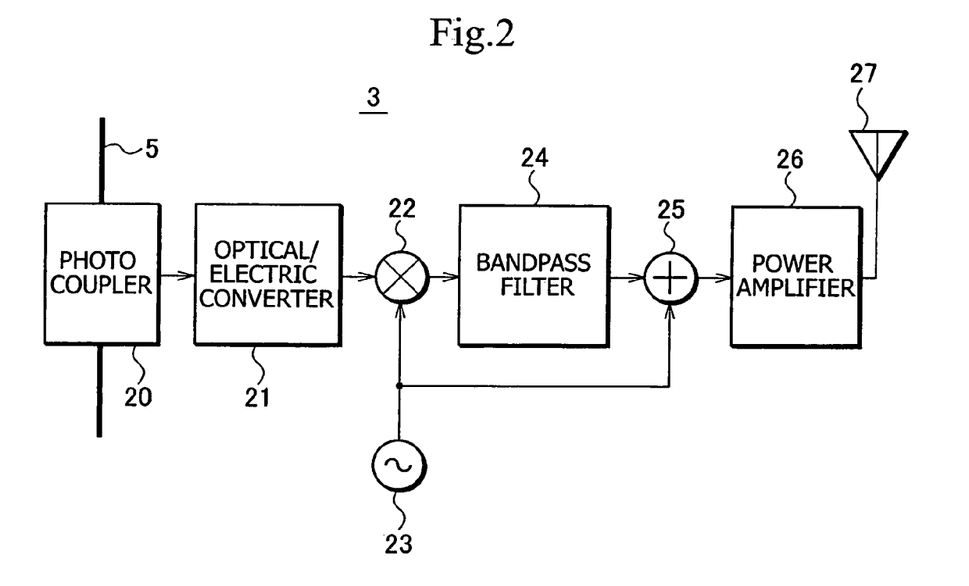
FIG. 2 is a block diagram showing a transmission configuration of an access point device.
Figure 3:
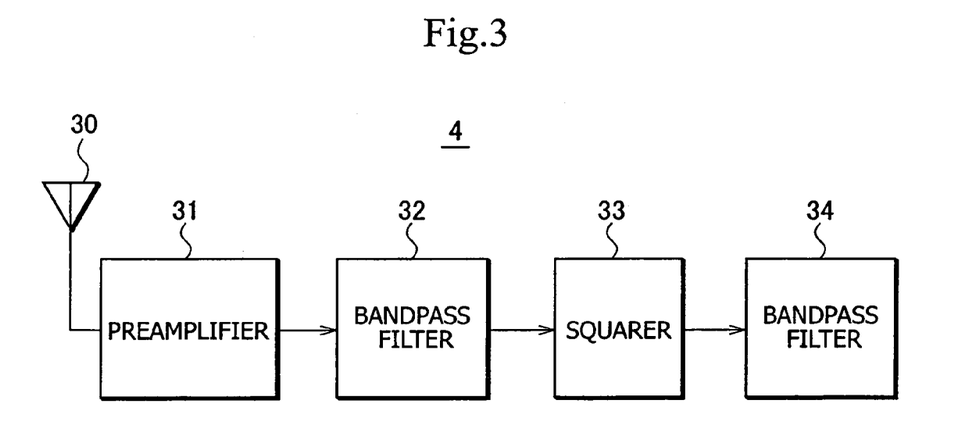
FIG. 3 is a block diagram showing a part of a receiving configuration of a mobile terminal.

FIG. 2 is a block diagram showing a transmission configuration of the access point devices 3 (=3-(k−1), 3-k, 3-(k+1), ... ). FIG. 3 is a block diagram showing a part of a receiving configuration of the mobile terminal 4.

In the first embodiment, the same radio frequency f0 in a millimeter wave band is assigned to all the access point devices 3 (=3-(k−1), 3-k, 3-(k+1), ... ) connected to the same optical fiber network 5. The access point devices 3 (=3-(k−1), 3-k, 3-(k+1), ... ) have the same internal configurations.

The access point device 3 has, as shown in FIG. 2, as a transmission configuration, a photo coupler 20, an optical/electric converter 21, a mixer (multiplier) 22, a local oscillator 23, a bandpass filter 24, a synthesizer 25, a power amplifier 26, and a transmission antenna 27.

The photo coupler 20 splits the intermediate frequency signal transmitted through the optical fiber 5, sent from the center station device 2, and consisting of an optical signal by two, drops the split signals in its own access point device 3, and transmits the signals to the downstream. The stage which transmits the signals to the downstream may include an optical amplifier. In the access point device 3 located at an end of the optical fiber network 5, the photo coupler 20 may be omitted.

The optical/electric converter 21 is to convert the intermediate frequency signal dropped by the photo coupler 20 and consisting of an optical signal into an electric signal and to give the electric signal to the mixer 22.

The mixer 22 functions as an up-converter together with the local oscillator 23. The local oscillator 23 is to oscillate a local oscillation signal having the radio frequency f0 in a millimeter wave band. The mixer 22 mixes the intermediate frequency signal and the local oscillation signal from the optical/electric converter 21 to up-convert the transmission signal to a signal in a radio frequency band.

The bandpass filter 24 is to remove an unnecessary component of the transmission signal output from the mixer 22.

Not only an output signal (transmission signal main body in a radio frequency band) from the bandpass filter 24 but also a local oscillation signal from the local oscillator 23 are given to the synthesizer 25. The synthesizer 25 synthesizes both the signals with each other.

Figure 4:
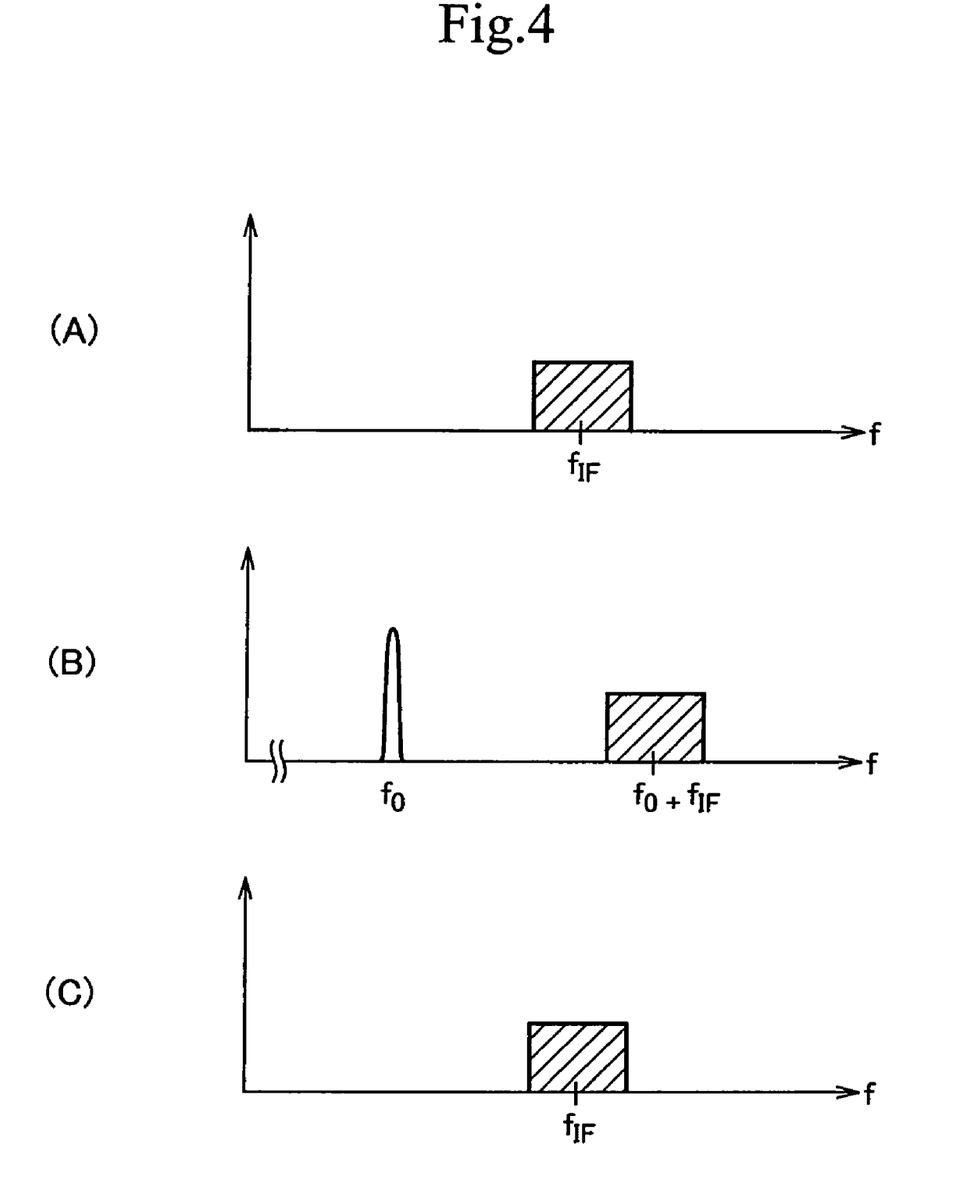
FIG. 4 is a spectrum diagram showing frequency characteristics at respective sections in the wireless communication system according to the first embodiment.

For example, when the intermediate frequency signal (center frequency is an intermediate frequency $f_{IF}$) having frequency characteristics shown in FIG. 4 (A) is given to the corresponding access point device 3, output signals from the synthesizer 25 are a local oscillation signal (local oscillation frequency f0) and a transmission signal main body in a radio frequency band (center frequency is f0+$f_{IF}$) as shown in the spectrum diagram in FIG. 4(B).

The power amplifier 26 amplifies the powers of the output signals from the synthesizer 25 and causes the transmission antenna 27 to emit radio waves toward the cover area of the access point device 3.

The mobile terminal 4 has, as shown in FIG. 3, as a receiving process configuration of a radio frequency band, a receiving antenna 30, a preamplifier 31, a bandpass filter 32, a squarer 33, and a bandpass filter 34.

The receiving antenna 30 captures the radio wave emitted from any one of the access point devices 3 and converts the radio wave into an electric signal. The receiving antenna 30 gives the obtained reception signal to the preamplifier 31, and the preamplifier 31 pre-amplifies the reception signal to the bandpass filter 32.

The bandpass filter 32 is to remove an unnecessary frequency component mixed in the signal in a wireless circuit and to extract only a band including the local oscillation signal and the transmission signal in the radio frequency band to give the band to the squarer 33.

The squarer 33 is to square an output signal from the bandpass filter 32 to give the signal to the bandpass filter 34.

The bandpass filter 34 is to extract a signal (intermediate frequency signal) in only an intermediate frequency band signal from the output signal from the squarer 33 to give the extracted signal to a circuit of the subsequent stage. By the squaring process of the squarer 33, an output signal from the squarer 33 includes a frequency component to which frequency components of output signals (see FIG. 4(B)) from the bandpass filter 32 are added or from which the respective frequency components of the output signals from the bandpass filter 32 are subtracted. However, the output signal from the squarer 33 is caused to pass through the bandpass filter 34, as shown in FIG. 4(C), only an intermediate frequency signal (center frequency is an intermediate frequency $f_{IF}$) can be extracted.

Since an output signal from the bandpass filter 34 is an intermediate frequency signal, a demodulating process is performed to a baseband signal in the subsequent circuit.

As described above, in downstream communication from the access point device 3 to the mobile terminal 4, a self-heterodyne transmission scheme in which a transmission signal is transmitted while being synthesized (superposed) with a local oscillation signal is applied. Although not shown, in upstream communication from the mobile terminal 4 to the access point device 3, the same self-heterodyne transmission scheme as that in the downstream direction is also applied. However, the frequency of the local oscillation signal in the upstream direction is preferably made different from the frequency f0 of the local oscillation signal in the downstream direction to completely separate the bands of an up-converted transmission signal and the local oscillation signal from each other.

When a transmission/reception antenna is arranged in the access point device 3 or the mobile terminal 4, a duplexer may be arranged to separate a transmission system and a reception system from each other.

The reason why the self-heterodyne transmission scheme in which the transmission signal is transmitted while being synthesized (superposed) with a local oscillation signal will be described below.

As described above, the same radio frequency f0 in a millimeter wave band is assigned to all the access point devices 3 (=3-(k−1), 3-k, 3-(k+1), . . . ) connected to the same optical fiber network 5. Each of the access point device 3-(k−1), 3-k, 3-(k+1), . . . has a local oscillator 23 which oscillates the frequency f0.

However, the technique of the local oscillator 23 which can stably oscillate a local oscillation signal in a millimeter wave band has not been sufficiently established. Frequency offsets may be generated between the local oscillators 23 of the respective access point devices 3-(k−1), 3-k, 3-(k+1). . . . Furthermore, phase noises caused by a change in environment (for example, temperature) may be different from each other in the local oscillators 23.

When an error component such as a frequency offset or phase noise is defined as θ(t) and an angular velocity relating to a local oscillation frequency is defined as $\omega_L$, a local oscillation signal L(t) can be expressed by Equation 1. On the other hand, when an intermediate frequency signal is defined as $\omega_{IF}$ by an angular velocity, an up-converted transmission signal main body S(t) can be expressed by Equation (2).

$$L(t)=\sin\{\omega_L t+\theta(t)\} \tag{1}$$

$$S(t)=\sin\{(\omega_L+\omega_{IF})t+\theta(t)\} \tag{2}$$

A sum S(t)+L(t) of Equation (1) and Equation (2) is transmitted from the access point device 3 to the mobile terminal 4 and subjected to a squaring process by the squarer 33. The squaring process is performed to generate a term as shown in Equation (3) obtained by multiplying L(t) and S(t).

$$L(t)\times S(t)=\sin\{\omega_L t+\theta(t)\}\times\sin\{(\omega_L+\omega_{IF})t\theta(t)\} \tag{3}$$

It is understood that, when a formula for converting a product of trigonometric functions into a sum and a difference is applied to Equation (3), the component of the difference includes only a component (angular velocity $\omega_{IF}$) of an intermediate frequency signal to cancel an error component θ(t) such as a frequency offset or phase noise. The component of the intermediate frequency signal is extracted by the bandpass filter 34, so that an original intermediate frequency signal sin ($\omega_{IF}\times t$) can be extracted.

This means that, even though frequency offsets and phase noises in the access point devices 3 (k−1), 3-k, 3-(k+1), . . . are different from each other, the mobile terminal 4 can demodulate an intermediate frequency sin without being affected by the frequency offsets and the phase noises.

The maximum doppler frequency is expressed by v/λ when the wavelength and the movement velocity are generally represented by λ and v, respectively. In this case, when the maximum doppler frequency to the transmission signal main body S(t) and the maximum doppler frequency to the local oscillation signal L(t) represented by $f_{DR}$ and $f_{DL}$, respectively, the maximum doppler frequency obtained through the bandpass filter 34 are expressed by Equation (4).

Reference symbols $\lambda_R$, $\lambda_L$, and $\lambda_{IF}$ express the wavelengths of the transmission signal main body, the local oscillation signal, and the intermediate frequency signal.

$$f_{DR} - f_{DL} = v \times \{(1/\lambda_R) - (1/\lambda_L)\} \quad (4)$$
$$= v/\lambda_{IF}$$

According to Equation (4), when the self-heterodyne transmission scheme is applied, the maximum doppler frequency after the signal is demodulated into the intermediate frequency signal is a doppler shift in an intermediate frequency band but a doppler shift in a radio frequency band. Therefore, it is understood that the doppler shift is reduced.

For example, the maximum doppler frequency received by a radio frequency in 60-GHz band is about 5.6 KHz when the maximum relative velocity is 100 Km/h is about 5.6 KHz. However, when an intermediate frequency of 400 MHz is used in this scheme, the maximum doppler frequency received by the transmission signal main body can be reduced to 37 Hz at most.

According to the first embodiment, even wireless communication using a millimeter wave band can be achieved by using all cover areas of the plurality of access point devices as a service area. Even though the respective cover areas of the respective access point devices are small due to the wireless communication using the millimeter wave band, the service area can be expanded.

According to the first embodiment, even though frequency offsets or phase noises of the local oscillators are different from each other in the respective access point devices, an intermediate frequency signal demodulated by a mobile terminal can be prevented from being affected by the difference in frequency offset or phase noise because the self-heterodyne scheme is applied. Similarly, even though frequency offsets or phase noises of the local oscillators are different from each other in the respective mobile terminals, an intermediate frequency signal demodulated by the access point device can be prevented from being affected by the difference in frequency offset or phase noise because the self-heterodyne transmission scheme is applied.

Furthermore, according to the first embodiment, since the self-heterodyne transmission scheme is applied, the maximum doppler frequency in the demodulated signal can be made smaller than that received in a radio frequency band.

Second Embodiment

A second embodiment of a wireless communication system according to the present invention will be described below with reference to the drawings.

Figure 5:
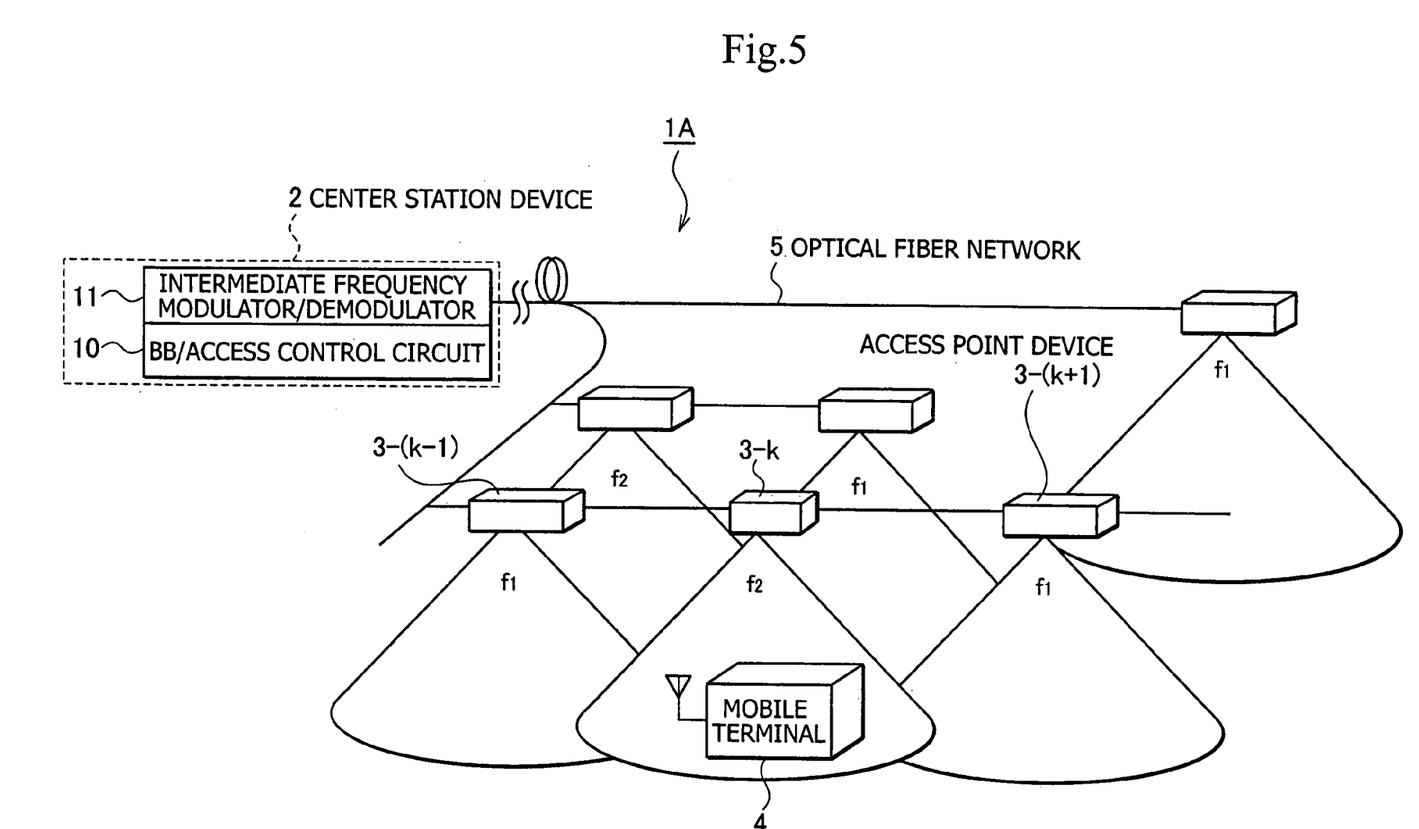
FIG. 5 is a block diagram showing an entire configuration of a wireless communication system according to a second embodiment.

FIG. 5 is a block diagram showing an entire configuration of a wireless communication system 1A according to the second embodiment.

The wireless communication system 1A according to the second embodiment is almost the same as the wireless communication system 1 according to the first embodiment. However, radio frequencies of transmission systems assigned to the respective access point devices 3-(k−1), 3-k, 3-(k+1), . . . in the second embodiment are different from those in the first embodiment.

More specifically, as a radio frequency (local oscillation frequency) from any one of the access point devices 3 to a mobile terminal 4, frequencies the number of which is equal to the number of access point devices signals of which are simultaneously received by the mobile terminal 4 at a boundary between the cover areas of the access point devices are prepared. The frequencies are assigned to the respective access point devices 3-(k−1), 3-k, 3-(k+1), . . . such that radio waves having the same frequency are not delivered to the mobile terminal 4 at the boundary. FIG. 5 shows an example in which, in consideration of a two-dimensional arrangement of the access point devices 3, radio frequencies are assigned to the access point devices 3-(k−1), 3-k, 3-(k+1), . . . such that frequencies $f_1$ and $f_2$ alternate in a certain direction and an orthogonal direction thereto.

The internal configuration of the access point device 3 is the same as that in the first embodiment (see FIG. 2). However, the second embodiment is different from the first embodiment in that a local oscillator 23 oscillates a local oscillation signal having an assigned local oscillation frequency.

The configuration of the mobile terminal 4 is the same as that in the first embodiment.

As in the first embodiment, a radio frequency in an upstream direction is changed into a radio frequency in a downstream direction. The radio frequency in the upstream direction may be only one radio frequency.

In this case, the same radio frequency is not assigned to the respective access point devices 3-(k−1) 3-k, 3-(k+1), . . . to improve receiving accuracy at a boundary between cover areas.

However, even when a plurality of different radio frequencies are assigned, a beat component may be included in the band of a demodulated intermediate frequency signal. In this case, beat components to be considered, a beat component between local oscillation signals used in different access point devices, a beat component between a local oscillation signal and a transmission signal main body used in different access point devices, and a beat component between transmission signal main bodies from different access point devices are known because the self-heterodyne scheme is employed for a radio signal obtained by superposing a local oscillation signal on a transmission signal main body.

Figure 6:
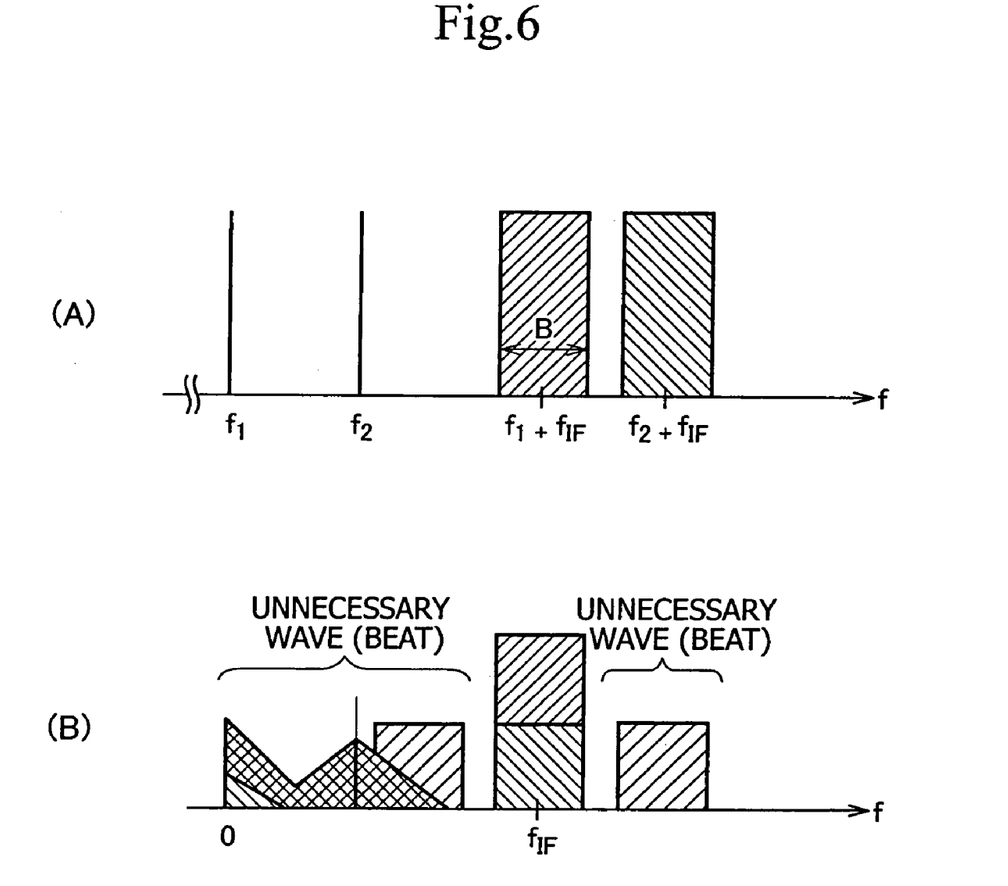
FIG. 6 is a spectrum diagram for explaining an assigning method of radio frequencies to access point devices according to the second embodiment.

FIGS. 6(A) and 6(B) are diagram for explaining these beat components.

An access point device (for example, the access point device 3-(k+1) in FIG. 5) to which a frequency $f_1$ is assigned as a radio frequency (local oscillation frequency) transmits a local oscillation signal having the frequency and a transmission signal main body having a modulation band width B centered on a frequency $f_1+f_{IF}$ (note that $f_{IF}$ is an intermediate frequency). The modulation band width B is equal to a modulation band width of the intermediate frequency signal, as a matter of course.

On the other hand, an access point device (for example, the access point device 3-k in FIG. 5) to which a frequency $f_2$ (note, $f_2>f_1$) is assigned as a radio frequency (local oscillation frequency) transmits a local oscillation signal having the frequency and a transmission signal main body having a modulation band width B centered on a frequency $f_2+f_{IF}$.

When radio waves from the two access point devices (3-(k+1) and 3-k) are captured and subjected to a squaring process by the mobile terminal 4, an output signal as shown in FIG. 6(B) is obtained from a squarer 33. Both the intermediate frequency signals appear in the same band. However, beat components also appear in various bands. In this case, as shown in FIG. 6(B), if the band of the beat component does not overlap the band of the intermediate frequency signal, only the intermediate frequency signal can be extracted by a bandpass filter 34. On the other hand, when the band of the beat component overlaps the band of the intermediate frequency signal, only the intermediate frequency signal cannot be extracted by the bandpass filter 34.

The center frequencies and bandwidths of the above various beat components can also be calculated. When, on the basis of the calculation result, a condition under the which the beat component does not overlaps the band of the intermediate frequency signal as shown in FIG. 6(B) is calculated, the following Equation (5) is obtained:

$$B < f_2 - f_1 < f_{IF} - (3B/2) \quad (5)$$

When different radio frequencies (local oscillation frequencies) are allocated to the access point devices 3-(k−1), 3-k, 3-(k+1), . . . to satisfy Equation (5), the receiving capability at a boundary can be improved.

Even though three or more different radio frequencies (local oscillation frequencies) are used, the radio frequencies may be assigned to the respective access point devices such that Equation (5) is satisfied for each combination of two radio frequencies which pose a problem at a boundary.

According to the second embodiment, the same advantage as that in the first embodiment can be achieved. More specifically, the advantage of the first embodiment is that communication cannot be affected by the value of a radio frequency. According to the second embodiment, the advantage can be achieved.

Furthermore, according to the second embodiment, in consideration of communication to a mobile terminal at a boundary between cover areas, radio frequencies are assigned to the respective access point devices, communication at the boundary between the cover areas can be preferably performed.

When a COFDM (Coding Orthogonal Frequency Division Multiplexing) scheme which is a modulation/demodulation scheme having high error correction capability is applied to compensate for deterioration of communication quality at a boundary between cover areas caused by an influence of transmission delay based on a difference between lengths of optical fibers between the center station device 2 and the respective access point devices 3, receiving accuracy can be more improved.

Another Embodiment

Although the above respective embodiments describe that wireless communication is performed such that a local oscillation signal is superposed to a transmission signal main body, communication may be performed through radio waves having different polarized wave surfaces.

Although the above respective embodiments describe that up-conversion to a radio frequency is performed by the access point device 3, the center station device 2 may perform up-conversion to a radio frequency, and the access point device 3 may simply perform radio transmission.

Although the explanations of the above respective embodiments do not mention a multiple access method used when a plurality of mobile terminals are present in a service area, the multiple access method is arbitrarily used, and a CDMA (Code Division Multiple Access) scheme, a TDMA (Time-Divisional Multiple Access) scheme, or the like can be applied.

Although the above respective embodiments explain the case in which a mobile terminal is used as a terminal station, the present invention can also be applied to a fixed terminal.

Furthermore, although the above respective embodiments explain two-way communication, the present invention can also be applied to a one-way communication system to a terminal station.

Still furthermore, although the above respective embodiments describe the case in which a radio frequency band is a millimeter wave band, the present invention can also be applied to a frequency band higher than a millimeter wave band.

INDUSTRIAL APPLICABILITY

A wireless communication system according to the present invention is usefully applied to a video multiplexing transmission system, a wireless LAN, a wireless home link, and a wireless road-vehicle communication system, and is especially suitable for a case in which a terminal station is a mobile terminal.

The invention claimed is:
1. A wireless communication system comprising:
  a terminal station;
  a center station device which forms a baseband signal to the terminal station; and
  a plurality of access point devices which receive delivered signals from the center station device through a cable network, have cover areas partially overlapping to constitute a service area by all the cover areas, and emit radio waves having frequencies not lower than a millimeter wave band to the terminal station; and
  wherein each of the access point devices has a configuration in which a transmission signal main body in a radio frequency band and a local oscillation signal having a radio frequency are simultaneously sent on the basis of the received delivered signal;
  wherein the terminal station has square-law means which performs a square-law detection of a synthesized signal of the received transmission signal main body and the local oscillation signal;
  wherein the center station device transmits an intermediate frequency signal obtained by up-converting a frequency of the baseband signal into an intermediate frequency band to the access point devices as delivered signals;
  wherein each of the access point devices up-converts the delivered signal into a transmission signal main body by using a local oscillation signal to transmit the transmission signal main body and the local oscillation signal in a wireless manner;

wherein, when the terminal station is located at a boundry between the cover areas, different radio frequencies are assigned to the plurality of access point devices from which the terminal station simultaneously receives signals; and wherein wireless frequencies $f_1$ and $f_2$ of two of the access point devices from which the terminal station simultaneously receives signals satisfy a conditional equation given by Equation (A):

$$B < f_2 - f_1 < f_{IF} - (3B/2) \quad (A)$$

where $f_{IF}$ is a center frequency of an intermediate frequency signal, and B is a modulate band width of the intermediate frequency signal.

2. The wireless communication system according to claim 1, wherein the center station device transmits a transmission signal body obtained by up-converting a frequency of the baseband signal into a radio frequency band and a local oscillation signal to the access point devices as delivered signals, and the access point devices transmit the delivered signals in a wireless manner.

3. The wireless communication system according to claim 2, wherein the terminal station is a mobile terminal.

4. The wireless communication system according to claim 1, wherein the terminal station is a mobile terminal.

* * * * *